United States Patent

Mine et al.

[11] Patent Number: 5,372,842
[45] Date of Patent: Dec. 13, 1994

[54] METHOD FOR THE FORMATION OF A SILICON OXIDE FILM

[75] Inventors: Katsutoshi Mine; Takashi Nakamura; Motoshi Sasaki, all of Chiba, Japan

[73] Assignee: Dow Corning Toray Silicone Co., Ltd, Tokyo, Japan

[21] Appl. No.: 146,358

[22] Filed: Oct. 29, 1993

[30] Foreign Application Priority Data

Dec. 14, 1992 [JP] Japan .................................. 4-353644

[51] Int. Cl.⁵ .............................................. B05D 5/12
[52] U.S. Cl. ................................ 427/126.2; 427/226; 427/377; 427/379; 427/387; 427/397.7; 437/235; 437/238
[58] Field of Search ............... 427/226, 228, 377, 379, 427/387, 397.7, 126.2; 437/235, 238

[56] References Cited

U.S. PATENT DOCUMENTS

| | | | |
|---|---|---|---|
| 4,756,977 | 9/1988 | Haluska et al. | 428/704 |
| 5,118,530 | 6/1992 | Hanneman et al. | 427/379 X |
| 5,145,723 | 9/1992 | Ballance et al. | 427/397.7 |

FOREIGN PATENT DOCUMENTS

| | | |
|---|---|---|
| 386969 | 9/1990 | European Pat. Off. |
| 462715 | 12/1991 | European Pat. Off. |
| 60-124943 | 7/1985 | Japan |

*Primary Examiner*—Michael Lusignan
*Attorney, Agent, or Firm*—Roger E. Gobrogge

[57] ABSTRACT

Disclosed is a method for the formation of a thick silicon oxide film which is insoluble in organic solvents and free of cracks and pinholes on the surface of a substrate. The method comprises forming a hydrogen silsesquioxane resin film on the surface of a substrate, converting the hydrogen silsesquioxane resin into preceramic silicon oxide by heating in an inert gas atmosphere, and converting the preceramic silicon oxide into silicon oxide ceramic by heating in an atmosphere selected from the group consisting of oxygen and oxygen mixed with an inert gas.

11 Claims, No Drawings

METHOD FOR THE FORMATION OF A SILICON OXIDE FILM

BACKGROUND OF THE INVENTION

The present invention relates to a method for the formation of a silicon oxide film on the surface of a substrate. More specifically, the present invention relates to a method for the formation of a thick silicon oxide film which is free of cracks and pinholes and which is insoluble in organic solvents.

The formation of a protective film on the surface of a substrate is a technique in general use. In the particular case of the electric/electronic industries, there has been a very substantial increase in the complexity of semiconductor devices and in topographical variations on the surface of semiconductor devices in association with recent increases in the degree of integration and layer count. An interlevel dielectric layer may be formed on the surface of a semiconductor device in order to planarize the topographical variations on the surface of the device, while a passivation coating can be laid down on the surface of a semiconductor device in order to protect it from mechanical damage, chemical damage, damage due to static, ionic contaminants, nonionic contaminants, radiation damage, and so forth.

Silicon oxide films are typically used for the interlevel dielectric layers and passivation coatings formed on semiconductor device surfaces. Chemical-vapor deposition (CVD) and spin-coating are examples of the methods used to form these silicon oxide films. As examples of methods for the formation of silicon oxide film on a semiconductor device surface by spin-coating, Japanese Patent Application Laid Open [Kokai or Unexamined] Numbers Sho 60-124943 [124,943/1985] and Sho 63-144525 [144,525/1988] and U.S. Pat. No. 5,145,723 propose the formation of a film of hydrogen silsesquioxane resin on the surface of the substrate (e.g., the semiconductor device, etc.) and subsequently heating the resin film-bearing substrate in air in order to form a silicon oxide film.

However, the methods proposed in Japanese Patent Application Laid Open Numbers Sho 60-124943 and Sho 63-144525 and U.S. Pat. No. 5,145,723 for silicon oxide film formation are not able to produce a silicon oxide film thicker than 0.6 micrometers (6,000 angstroms). As a result, these methods cannot completely planarize the topographical variations encountered on the surfaces of semiconductor devices, i.e., topographical variations or height differences in excess of 1.0 micrometers (10,000 angstroms). In addition, when the production of a thick silicon oxide film is attempted by these methods, cracks and pinholes are produced in the silicon oxide film and the reliability of the semiconductor device is drastically reduced.

The inventors conducted extensive research into the cause of the inability of the methods proposed in Japanese Patent Application Laid Open Numbers Sho 60-124943 and Sho 63-144525 and U.S. Pat. No. 5,145,723 to produce thick silicon oxide films. As a result, in the case of methods in which the substrate is heated from the very first in an oxygen-rich atmosphere after formation of the hydrogen silsesquioxane resin film on the substrate, it was discovered that crosslinking in the resin develops rapidly and large internal stresses appear in the resin film, which results in the production of cracks. It was also discovered that crack-free silicon oxide films with maximum thicknesses in excess of 1 micrometer can be produced through the reduction in crosslinking rate and relaxation in internal stresses in the resin film that are afforded by a method in which the substrate carrying the hydrogen silsesquioxane resin film is initially heated in an inert gas atmosphere in order to convert the hydrogen silsesquioxane resin film into a preceramic silicon oxide and is subsequently heated in an oxygen atmosphere or mixed gas atmosphere of oxygen plus inert gas. Said preceramic silicon oxide refers to a material which is a precursor for ceramic silicon oxide and which is already insoluble in organic solvent although its crosslinking is not as advanced as in ceramic silicon oxide.

The present invention takes as its object the introduction of a method for the formation of an organic solvent-insoluble, crack-free and pinhole-free silicon oxide thick film.

SUMMARY OF THE INVENTION

The present invention relates to a method for the formation of a silicon oxide film. The method comprises forming a hydrogen silsesquioxane resin film on the surface of a substrate, converting the hydrogen silsesquioxane resin into preceramic silicon oxide by heating tile resin film-bearing substrate in an inert gas atmosphere, and converting the preceramic silicon oxide into silicon oxide ceramic by heating the substrate bearing the preceramic silicon oxide in an atmosphere selected from the group consisting of oxygen and oxygen mixed with an inert gas until the content of silicon-bonded hydrogen in the silicon oxide product has reached $\leq 80\%$ of the content of silicon-bonded hydrogen in the hydrogen silsesquioxane resin.

The present invention also relates to a method for the formation of a silicon oxide film on the surface of a semiconductor device. The method is characterized by the formation of a hydrogen silsesquioxane resin film on the surface of a semiconductor device, the conversion of said hydrogen silsesquioxane resin into preceramic silicon oxide by heating the resin film-bearing semiconductor device in an inert gas atmosphere, and the subsequent conversion of the preceramic silicon oxide into silicon oxide ceramic by heating said substrate bearing the preceramic silicon oxide in an atmosphere selected from the group consisting of oxygen and oxygen mixed with an inert gas oxygen until the content of silicon-bonded hydrogen in the silicon oxide product has reached $\leq 80\%$ of the content of silicon-bonded hydrogen in the hydrogen silsesquioxane resin.

The present invention further relates to a method for the formation of silicon oxide film which is characterized by planarization of the topographical variations on the surface of a semiconductor device by the formation thereon of a hydrogen silsesquioxane resin film, conversion of said hydrogen silsesquioxane resin into preceramic silicon oxide by heating the resin film-bearing semiconductor device in an inert gas atmosphere, and subsequent conversion of the preceramic silicon oxide into silicon oxide ceramic by heating said substrate bearing the preceramic silicon oxide in an atmosphere selected from the group consisting of oxygen and oxygen mixed with an inert gas until the content of silicon-bonded hydrogen in the silicon oxide product has reached $\leq 80\%$ of the content of silicon-bonded hydrogen in the hydrogen silsesquioxane resin.

DETAILED DESCRIPTION OF THE INVENTION

The method of the present invention forms silicon oxide films which are thick, free of cracks and pinholes and which are insoluble in organic solvents. Generally, the process of the invention involves forming a hydrogen silsesquioxane resin film on the surface of a substrate, heating the hydrogen silsesquioxane resin in an inert gas atmosphere to convert it into preceramic silicon oxide, and heating the preceramic silicon oxide in an atmosphere selected from the group consisting of oxygen and oxygen mixed with an inert gas to convert it into a silicon oxide ceramic. The hydrogen silsesquioxane resin used by the present invention to coat the substrate surface is a compound with the following formula:

$$(HSiO_{3/2})_n$$

wherein n is an integer. Its terminal groups, molecular weight, and structure are not specifically restricted, although molecular weights of approximately 400 to 100,000 are preferred. Its physical properties, such as viscosity, softening point, etc., are also not specifically restricted. In addition, the content of silicon-bonded hydrogen in the hydrogen silsesquioxane resin used by the invention is not specifically restricted. This value will vary with the molecular weight and type of terminal groups. In general, the silicon-bonded hydrogen content is 1.5 to 2.5 weight % calculated on the hydrogen silsesquioxane resin.

The specific method for synthesis of the hydrogen silsesquioxane is also not restricted. Methods for hydrogen silsesquioxane synthesis are specifically exemplified by the hydrolysis of trichlorosilane using the crystal water of benzenesulfonic acid or toluenesulfonic acid (U.S. Pat. No. 3,615,272) and by the hydrolysis of trichlorosilane in dilute solution using a small quantity of water (Japanese Patent Application Laid Open Number Sho 60-86017 [86,017/1985]).

The procedure used in the present invention to form the hydrogen silsesquioxane resin film on the surface of the substrate is not particularly restricted. This procedure is specifically exemplified by the following two methods: (1) preparation of an organic solvent solution of the hydrogen silsesquioxane resin, application of this solution by spin-coating, spraying, or immersion, then removal of the solvent to yield a film of the hydrogen silsesquioxane resin on the surface of the substrate; (2) heating a low-molecular-weight hydrogen silsesquioxane resin at reduced pressure in order to bring about vapor deposition of the resin on the surface of the substrate. The former method is preferred.

There is no specific restriction on the organic solvent used to dissolve the hydrogen silsesquioxane resin in tile former method. Preferably, the structure of this organic solvent does not contain active hydrogen. The organic solvent under consideration is specifically exemplified by aromatic solvents such as toluene, xylene, and so forth; aliphatic solvents such as hexane, heptane, octane, and so forth; ketone solvents such as methyl ethyl ketone, methyl isobutyl ketone, and so forth; and ester solvents such as butyl acetate, isoamyl acetate, and so forth. Additional examples of this solvent are silicone solvents, for example, linear siloxanes such as 1,1,1,3,3,3-hexamethyldisiloxane, 1,1,3,3-tetramethyldisiloxane, and so forth; cyclic siloxanes such as 1,1,3,3,5,5,7,7-octamethyltetracyclosiloxane, 1,3,5,7-tetramethyltetracyclosiloxane, and so forth; and silanes such as tetramethylsilane, dimethyldiethylsilane, and so forth. Mixtures of two or more of these organic solvents can also be used.

The specific substrates operable in the present invention are not restricted. The substrate is specifically exemplified by glass substrates ceramic substrates, metal substrates, and semiconductor devices, with semiconductor devices being particularly preferred. The surface of the semiconductor device may present topographical variations, in which event the surface of the semiconductor device can be planarized by tile silicon oxide film formation method of the present invention.

The substrate bearing the hydrogen silsesquioxane resin film is subsequently heated first in an inert gas atmosphere in order to convert the hydrogen silsesquioxane resin into preceramic silicon oxide. It is then heated in an oxygen atmosphere or in a mixed gas atmosphere of oxygen+inert gas, in either case until the content of silicon-bonded hydrogen in the produced silicon oxide reaches $\leq 80\%$ of the content of silicon-bonded hydrogen in the hydrogen silsesquioxane resin.

The inert gas used for conversion of the hydrogen silsesquioxane resin film to preceramic silicon oxide is not specifically restricted. This inert gas is specifically exemplified by nitrogen, argon, helium, and neon. Nitrogen is preferred for its low cost and ease of acquisition on an industrial basis.

Heating of the hydrogen silsesquioxane resin in an inert gas atmosphere produces a preceramic silicon oxide. While no restrictions apply to the physical and chemical properties of the preceramic silicon oxide, it must be crosslinked to the extent that it has become insoluble in organic solvent.

The heating temperature for the hydrogen silsesquioxane resin film formed on the substrate is not specifically restricted. Heating temperatures of at least 250° C., however, are preferred and heating temperatures in the range of 250° C. to 500° C. are particularly preferred. At heating temperatures below 250° C., the hydrogen silsesquioxane resin is not satisfactorily converted into preceramic silicon oxide without a lengthy period of heating. As a result, the preceramic silicon oxide obtained by heating for a short period of time remains soluble in organic solvent and is unfit as a passivation coating or interlevel dielectric layer.

The heating time is also not specifically restricted, but the heating time must be sufficient to convert the hydrogen silsesquioxane resin into preceramic silicon oxide.

No specific restrictions are imposed by the present invention on either the oxygen/inert gas mixing ratio or the purity of the oxygen gas used for conversion of the preceramic silicon oxide to ceramic silicon oxide. Inert gases useable for this purpose are specifically exemplified by nitrogen, argon, helium, and neon. Nitrogen is preferred for its low cost and ease of acquisition on an industrial basis. The proportions of oxygen and inert gas are not specifically restricted in the case of the mixed gas of oxygen and inert gas, and air is preferred for this mixed gas.

Ceramic silicon oxide can be produced by heating the preceramic silicon oxide in oxygen or a mixed gas atmosphere of oxygen+inert gas in accordance with the present invention. While the heating temperature for. converting the preceramic silicon oxide into ceramic silicon oxide is not specifically restricted, it is preferably at least 250° C. and more preferably falls in the range of 250° C. to 500° C. At heating temperatures below 250° C., the preceramic silicon oxide is not satisfactorily converted into ceramic silicon oxide without a lengthy period of heating, and the ceramic silicon oxide obtained by heating for a short period of time will be unfit as a passivation coating or interlevel dielectric layer. In addition, while the heating time is not particularly restricted, the heating time must be sufficient to convert the preceramic silicon oxide into ceramic silicon oxide. In specific terms, no particular restrictions apply to the heating time except that heating must be carried out for a period of time sufficient for the content of silicon-bonded hydrogen in the silicon oxide product to reach $\leq 80\%$ of the content of silicon-bonded hydrogen in the starting hydrogen silsesquioxane resin. When the content of silicon-bonded hydrogen in the silicon oxide exceeds 80% of the content of silicon-bonded hydrogen in the starting hydrogen silsesquioxane resin, the silicon oxide will not be capable of functioning as a passivation coating or interlevel dielectric layer.

An infrared spectrophotometer can be used to measure the silicon-bonded hydrogen content in both the hydrogen silsesquioxane resin film and silicon oxide film formed on the surface of the substrate. The point at which the silicon-bonded hydrogen content in the silicon oxide film reaches $\leq 80\%$ of the silicon-bonded hydrogen content in the starting hydrogen silsesquioxane resin is readily determined in the present invention using an infrared spectrophotometer from the intensity ratio K'/K wherein K is the intensity of the SiH peak (vicinity of 2250 cm$^{-1}$) relative to the SiOSi peak (vicinity of 1100 cm$^{-1}$) in the hydrogen silsesquioxane resin film and K' is the intensity of the SiH peak (vicinity of 2250 cm$^{-1}$) relative to the SiOSi peak (vicinity of 1100 cm$^{-1}$) in the silicon oxide that is produced.

The silicon oxide film formation method of the present invention can produce a thick (greater than 0.6 micrometers), crack-free, and pinhole-free silicon oxide film that is capable of functioning as a passivation coating or interlevel dielectric layer. For example, this method can produce crack and pinhole-free silicon oxide films with thicknesses greater than 1.0 micrometers. Furthermore, the crosslink density in the silicon oxide film can be freely controlled or adjusted in the method of the present invention. This provides the additional effect of making possible relaxation of the internal stresses in the silicon oxide film that is produced. Moreover, because the method of the present invention can produce a silicon oxide film at low temperatures, it is useful for the formation of an interlevel dielectric layer or passivation coating on a semiconductor device surface because it avoids the melting-based deterioration of the aluminum that is used for semiconductor device interconnections.

The method of the present invention is useful for the formation of the interlevel dielectric layer in multilayer semiconductor devices because an organic resin layer, silicon oxide layer, and so forth, can additionally be formed on the surface of a substrate carrying the silicon oxide film formed by the method of the present invention.

The present invention is explained in greater detail below through working and comparison examples. The method described below was used to measure the value of the silicon-bonded hydrogen content in the silicon oxide film relative to the silicon-bonded hydrogen content in the hydrogen silsesquioxane resin film formed on the surface of the semiconductor device.

Using an infrared spectrophotometer, the intensity $I_{SiOSi}$ of the SiOSi peak (vicinity of 1100 cm$^{-1}$) and the intensity $I_{SiH}$, of the SiH peak (vicinity of 2250 cm$^{-1}$) were determined for the hydrogen silsesquioxane resin film formed on the surface of the semiconductor device, and their ratio K was calculated from $K = I_{SiH}I_{SiOSi}$. The intensity $I'_{SiOSi}$ of the SiOSi peak (vicinity of 1100 cm$^{-1}$) and the intensity $I'_{SiH}$ of the SiH peak (vicinity of 2250 cm$^{-1}$) were also determined for the silicon oxide film subsequently formed on the surface of the semiconductor device, and their ratio K' was calculated from $K' = I'_{SiH}/I'_{SiOSi}$. The ratio K'/K was then calculated.

REFERENCE EXAMPLE 1

Hydrogen silsesquioxane resin was prepared by the method taught in Japanese Patent Publication Number Sho 47-31838 [31,838/1972] as follows:

Toluenesulfonic acid monohydrate was prepared by dripping 6 moles toluene over a period of 1 hour into a mixture of 3.75 moles sulfuric acid and 2.25 moles fuming sulfuric acid at a mixture temperature of 45° C. to 60° C. and then ageing for an additional 30 minutes at 45° C. Into this product was then dripped the mixture of 1 mole trichlorosilane and 6.6 moles toluene over a period of 5 hours at 30° C. followed by ageing for 30 minutes at 45° C. After cooling and layer separation, the toluenesulfonic acid layer (lower layer) was removed. In order to remove the acid present in the upper layer, it was washed with suitable quantities of sulfuric acid/water (50/50 weight ratio), then sulfuric acid/water (25/75 weight ratio), and finally water. The water was then completely eliminated by azeotropic drying for 1 hour to afford a toluene solution. Removal of the toluene fro by reduced pressure (vacuum pump) at 60° C. gave hydrogen silsesquioxane resin A. This hydrogen silsesquioxane resin A had a number-average molecular weight ($M_n$) of 1,650, and the value of its weight-average molecular weight/number-average molecular weight ratio ($M_w/M_n$) was 19.4.

20 g hydrogen silsesquioxane resin A was then placed an a thoroughly dried 1 L roundbottom flask made of high-quality glass. 80 g thoroughly dried toluene was added and a thorough dissolution was effected. The entire system was maintained at 25° C., and the interior of the system was purged with nitrogen at a rate that did not remove solvent from the system. This purging was continued until the completion of fractionation. While vigorously stirring the solution, 50 g thoroughly dried acetonitrile was dripped in over a period of 1 hour. The precipitate was eliminated after quiescence for approximately 12 hours. After elimination of the precipitate, another 200 g thoroughly dried acetonitrile was dripped into the solution over a period of 4 hours. Collection of the resulting precipitate and removal of the residual solvent therefrom by vacuum drying at ambient temperature yielded a hydrogen silsesquioxane resin B. The $M_n$ of this hydrogen silsesquioxane resin B was 11,400 and its $M_w/M_n$ was 2.88. The ionic and metal impurities were each $\leq 1$ ppm.

EXAMPLE 1

Hydrogen silsesquioxane resin B was dissolved in methyl isobutyl ketone (MIBK) to prepare the 30 weight % solution. This solution was spin-coated on a substrate for semiconductor device fabrication (height variation=1.0 micrometers) to give a hydrogen silsesquioxane resin film having a maximum thickness of 1.15 micrometers. After this film formation step, the semiconductor device substrate was held for 20 hours in a pure nitrogen atmosphere and then heated for 2 hours at 400° C. in a pure nitrogen atmosphere to produce a preceramic silicon oxide film on the semiconductor device. This preceramic silicon oxide was insoluble in MIBK. The semiconductor device substrate carrying the preceramic silicon oxide was then heated for 1 hour at 400° C. in a pure oxygen atmosphere. This was followed by gradual cooling of the semiconductor device substrate in a pure nitrogen atmosphere to room temperature. Evaluation of the properties of the silicon oxide film formed on the substrate confirmed that the maximum thickness was 1.00 micrometers and the topographical variations of a semiconductor device surface were planarized to uniformity. It was confirmed at the same time that there were no pinholes or cracks in the silicon oxide film. Based on the results of infrared spectrophotometric analysis, the silicon-bonded hydrogen content in the silicon oxide film was 8% of the silicon-bonded hydrogen content in the hydrogen silsesquioxane resin film prior to heating. It was also confirmed that the obtained silicon oxide film was insoluble in organic solvents such as MIBK and so forth.

EXAMPLE 2

Hydrogen silsesquioxane resin B was dissolved in MIBK to prepare the 30 weight % solution. This solution was spin-coated on a substrate for semiconductor device fabrication (height variation=1.0 micrometers) to give a hydrogen silsesquioxane resin film having a maximum thickness of 1.36 micrometers. After this film formation step, the semiconductor device substrate was held for 20 hours in a pure nitrogen atmosphere and then heated for 4 hours at 400° C. in a pure nitrogen atmosphere to give a preceramic silicon oxide on the semiconductor device. This preceramic silicon oxide was insoluble in MIBK. The semiconductor device substrate carrying the preceramic silicon oxide was subsequently heated for 1 hour at 400° C. in a mixed gas with a composition of 20 volume % pure oxygen and 80 volume % pure nitrogen. The gas component proportions in this mixed gas were precisely controlled using a mass flow controller. This was followed by gradual cooling of the semiconductor device substrate in a pure nitrogen atmosphere to room temperature. Evaluation of the properties of the silicon oxide film formed on the substrate confirmed that the maximum thickness was 1.12 micrometers and the topographical variations of a semiconductor device surface were planarized to uniformity. It was confirmed at the same time that there were no pinholes or cracks in the silicon oxide film. Based on the results of infrared spectrophotometric analysis, the silicon-bonded hydrogen content in the silicon oxide film was 14% of the silicon-bonded hydrogen content in the hydrogen silsesquioxane resin film prior to heating. It was also confirmed that this silicon oxide film was insoluble in organic solvents such as MIBK and so forth.

COMPARISON EXAMPLE 1

Hydrogen silsesquioxane resin B was dissolved in MIBK to prepare the 30 weight % solution. This solution was spin-coated on a substrate for semiconductor device fabrication (height variation=1.0 micrometers) to give a hydrogen silsesquioxane resin film having a maximum thickness of 1.15 micrometers. After this film formation step, the semiconductor device substrate was held for 20 hours in a pure nitrogen atmosphere and then heated for 2 hours at 400° C. in a mixed gas that at 21 volume % pure oxygen and 79 volume % pure nitrogen had almost the same component proportions as air. The gas component proportions in this mixed gas were precisely controlled using a mass flow controller. The semiconductor device substrate was then gradually cooled to room temperature in a pure nitrogen atmosphere. When the properties of the silicon oxide film formed on the substrate were evaluated, it was found that the maximum thickness was 0.98 micrometers, but also that a large number of cracks had been produced in the surface of the silicon oxide film and the topographical variations of a semiconductor device surface were not able to be planarized to uniformity. Based on the results of infrared spectrophotometric analysis, the silicon-bonded hydrogen content in the silicon oxide film was 15% of the silicon-bonded hydrogen content in the hydrogen silsesquioxane resin film prior to heating.

COMPARISON EXAMPLE 2

Hydrogen silsesquioxane resin B was dissolved in MIBK to prepare the 30 weight % solution. This solution was spin-coated on a substrate for semiconductor device fabrication (height variation=1.00 micrometers) to give a hydrogen silsesquioxane resin film having a maximum thickness of 1.15 micrometers. After this film formation step, the semiconductor device substrate was held for 20 hours in a pure nitrogen atmosphere, then heated for 4 hours at 200° C. in a pure nitrogen atmosphere, and finally heated for 4 hours at 200° C. in a mixed gas having a composition of 20 volume % pure oxygen and 80 volume % pure nitrogen. The gas component proportions in this mixed gas were precisely controlled using a mass flow controller. This was followed by gradual cooling of the semiconductor device substrate in a pure nitrogen atmosphere to room temperature. When the properties of the silicon oxide film formed on the substrate were examined, it was determined that the maximum thickness was 1.08 micrometers and that a crack- and pinhole-free silicon oxide film had been formed. However, this silicon oxide film could be redissolved in toluene. Based on the results of infrared spectrophotometric analysis, the silicon-bonded hydrogen content in the silicon oxide film was 100% of the silicon-bonded hydrogen content in the hydrogen silsesquioxane resin film prior to heating, which confirmed the complete absence of ceramification.

COMPARISON EXAMPLE 3

Hydrogen silsesquioxane resin B was dissolved in MIBK to prepare the 30 weight % solution. This solution was spin-coated on a substrate for semiconductor device fabrication (height variation=0.8 micrometers) to give a hydrogen silsesquioxane resin film having a maximum film thickness of 1.26 micrometers. After this film formation step, the semiconductor device substrate was held for 20 hours in a pure nitrogen atmosphere. The topographical variations of the semiconductor device surface were then planarized to uniformity by the softened hydrogen silsesquioxane resin by raising the temperature from room temperature to 400° C. over a period of 45 minutes in a pure nitrogen atmosphere. During this stage the hydrogen silsesquioxane resin on the semiconductor device remained readily soluble in MIBK. After the temperature of the semiconductor device had reached 400° C., the atmosphere was rapidly changed over to a pure oxygen atmosphere and heating was then continued for 2 hours at 400° C. After this, the semiconductor device substrate was gradually cooled to room temperature in a pure nitrogen atmosphere. When the properties of the silicon oxide film formed on the substrate were evaluated, it was found that the maximum thickness was 0.33 micrometers, but also that a large number of cracks had been produced in the surface of the silicon oxide film and the topographical variations of a semiconductor device surface were not able to be planarized to uniformity. Based on the results of infrared spectrophotometric analysis, the silicon-bonded hydrogen content in the silicon oxide film was 12% of the silicon-bonded hydrogen content in the hydrogen silsesquioxane resin film prior to heating.

That which is claimed is:

1. A method for the formation of a silicon oxide film comprising:
    forming a hydrogen silsesquioxane resin film on the surface of a substrate;
    converting the hydrogen silsesquioxane resin into preceramic silicon oxide by heating the resin film-bearing substrate in an inert gas atmosphere; and
    converting the preceramic silicon oxide into silicon oxide ceramic by heating the substrate bearing the preceramic silicon oxide in an atmosphere selected from the group consisting of oxygen and oxygen mixed with an inert gas until the content of silicon-bonded hydrogen in the silicon oxide product has reached $\leq 80\%$ of the content of silicon-bonded hydrogen in the hydrogen silsesquioxane resin.

2. The method of claim 1 wherein the heating temperature for converting the hydrogen silsesquioxane resin into preceramic silicon oxide under inert gas is at least 250° C.

3. The method of claim 1 wherein the heating temperature for converting the preceramic silicon oxide into silicon oxide ceramic is at least 250° C.

4. The method of claim 1 wherein the hydrogen silsesquioxane resin film is formed on the surface of the substrate by preparing an organic solvent solution of the hydrogen silsesquioxane resin, applying this solution by a method selected from the group consisting of spin-coating, spraying, or immersion, and removing the solvent.

5. The method of claim 4 wherein the organic solvent is selected from the group consisting of aromatic solvents, aliphatic solvents, ketone solvents, ester solvents, and silicone solvents.

6. The method of claim 1 wherein the substrates is selected from the group consisting of glass substrates, ceramic substrates, metal substrates, and semiconductor devices.

7. The method of claim 1 wherein the inert gas is selected from the group consisting of nitrogen, argon, helium, and neon.

8. The method of claim 1 wherein the heating temperature for converting the hydrogen silsesquioxane resin into preceramic silicon oxide under inert gas is in the range of 250° C. to 500° C.

9. The method of claim 1 wherein the heating temperature for converting tile preceramic silicon oxide into silicon oxide ceramic is in the range of 250° C. to 500° C.

10. A method for the formation of a silicon oxide film wherein said method is characterized by the formation of a hydrogen silsesquioxane resin film on the surface of a semiconductor device, the conversion of said hydrogen silsesquioxane resin into preceramic silicon oxide by heating the resin film-bearing semiconductor device in an inert gas atmosphere, and the subsequent conversion of the preceramic silicon oxide into silicon oxide ceramic by heating said substrate bearing the preceramic silicon oxide in an atmosphere selected from the group consisting of oxygen and oxygen mixed with an inert gas until the content of silicon-bonded hydrogen in the silicon oxide product has reached $\leq 80\%$ of the content of silicon-bonded hydrogen in the hydrogen silsesquioxane resin.

11. A method for the formation of a silicon oxide film wherein said method is characterized by
    planarization of the topographical variations on the surface of a semiconductor device by the formation thereon of a hydrogen silsesquioxane resin film,
    conversion of said hydrogen silsesquioxane resin into preceramic silicon oxide by heating the resin film-bearing semiconductor device in an inert gas atmosphere, and
    subsequent conversion of the preceramic silicon oxide into silicon oxide ceramic by heating said substrate bearing the preceramic silicon oxide in an atmosphere selected from the group consisting of oxygen and oxygen mixed with an inert gas until the content of silicon-bonded hydrogen in the silicon oxide product has reached $\leq 80\%$ of the content of silicon-bonded hydrogen in the aforesaid hydrogen silsesquioxane resin.

* * * * *